United States Patent [19]
Bailey et al.

[11] Patent Number: 6,135,539
[45] Date of Patent: *Oct. 24, 2000

[54] FOLDOUT RECREATIONAL VEHICLE

[75] Inventors: Dennis L. Bailey, Goshen; William J. Devos, Bristol, both of Ind.

[73] Assignee: R-Vision, Warsaw, Ind.

[ * ] Notice: This patent is subject to a terminal disclaimer.

[21] Appl. No.: 09/439,596

[22] Filed: Nov. 12, 1999

Related U.S. Application Data

[63] Continuation of application No. 09/103,081, Jun. 23, 1998, Pat. No. 5,992,920.

[51] Int. Cl.$^7$ ............................................. B60P 3/345
[52] U.S. Cl. ......................... 296/169; 296/172; 296/174; 296/26.11
[58] Field of Search .................................. 296/169, 172, 296/174, 176, 173, 26.01, 26.02, 26.11, 26.15, 190.02, 24.1, 165

[56] References Cited

U.S. PATENT DOCUMENTS

| | | | |
|---|---|---|---|
| 1,715,221 | 5/1929 | Carpenter et al. | 296/26.11 |
| 2,167,557 | 7/1939 | Stout | 296/23 |
| 2,954,260 | 9/1960 | Wright | 296/23 |
| 3,351,373 | 11/1967 | Christin | 296/23 |
| 3,511,529 | 5/1970 | Cutsinger | 296/23 |
| 3,558,181 | 1/1971 | Peterson | 296/26.02 |
| 3,608,953 | 9/1971 | Bernard | 296/169 |
| 3,680,908 | 8/1972 | Bowen | 293/23 |
| 3,811,723 | 5/1974 | Anderson | 296/26 |
| 3,887,226 | 6/1975 | Hart | 296/26 |
| 4,222,604 | 9/1980 | Human | 296/165 |
| 4,657,300 | 4/1987 | Penny et al. | 296/173 |
| 5,143,417 | 9/1992 | Philley et al. | 296/176 |
| 5,417,468 | 5/1995 | Baumgartner et al. | 296/162 |
| 5,505,515 | 4/1996 | Turner | 296/173 |
| 5,992,920 | 11/1999 | Bailey et al. | 296/169 |

*Primary Examiner*—D. Glenn Dayoan
*Assistant Examiner*—Patricia L Engle
*Attorney, Agent, or Firm*—James D. Hall; Ken C. Decker

[57] ABSTRACT

A towable recreational vehicle includes main living quarters having solid side and end walls with panels pivotably mounted on each of the end walls supported by removable light weight support rods engaging sockets on the end walls and on the vehicle frame. A flexible fabric enclosure is supported on a frame carried by the panels which includes a removable component which may be snapped out of a socket in the main living quarters and stored when the panels are folded to the closed position. A mattress includes portions supported on the panel and on a shelf within the unit, the portion on the shelf being flipped over to rest on the panel and secured in place before the panel is closed against the unit. Accordingly, auxiliary living space is provided by unfolding the panels from the main living quarters, but the panels may be easily closed when the unit is moved.

4 Claims, 4 Drawing Sheets

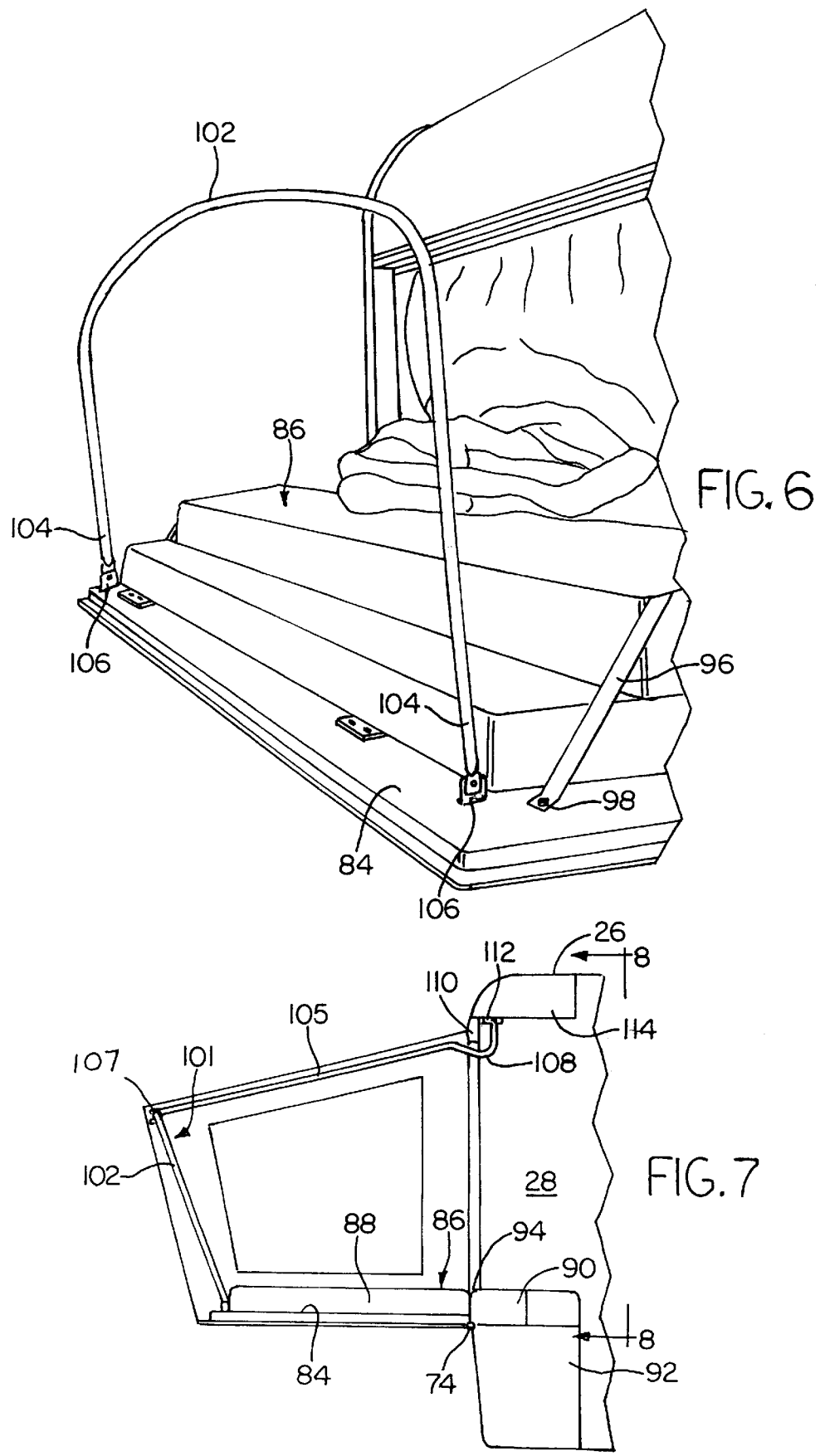

FOLDOUT RECREATIONAL VEHICLE

CROSS REFERENCE TO RELATED APPLICATION

This is a continuation of application Ser. No. 09/103,081 filed Jun. 23, 1998, U.S. Pat. No. 5,992,920.

BACKGROUND OF THE INVENTION

This invention relates to a recreational vehicle having one or more fold out portions to provide auxiliary living space.

It is desirable that towable recreational vehicles be as large as possible yet they must be light in weight to permit touring by the smaller vehicles which have become common. Existing light weight recreational vehicles include tent campers which have flexible fabric sides which collapsed to a relatively small height when the unit is moved and then expanded by raising the roof to deploy the fabric side walls when the unit is parked for use while at the same time sliding headboards out from the ends of the vehicles to provide sleeping space. Other types of towable recreational vehicles have solid sides, but these tend to be much larger, heavier, and more difficult to tow then the smaller tent campers. Furthermore, most users prefer the style and security provided by the conventional units having solid side walls and a fixed roof.

SUMMARY OF THE INVENTION

The present invention provides a towable recreation vehicle with rigid walls and a fixed roof. Panels are provided in the end walls thereof and are connected to the walls by a hinged connection to permit the panels to fold out into a horizontal orientation to cooperate with a flexible fabric enclosure to define axillary living area to providing sleeping space. When the unit is to be moved, the panels are folded flush with the end walls, thereby securing the unit and providing an attractive appearance similar to other fixed walled units. Removable supports for the panel and for the fabric enclosure provide a light weight arrangement for supporting the latter when the panels are deployed, but permit the fabric enclosures to be folded away and the panel returned to the position flush with the walls to permit the unit to be moved. When in the closed condition, the panels only minimally interfere with the interior living space provided by the main living quarters, so that the unit may be used even if the panels remain in the closed position.

Accordingly, a small, compact light weight towable RV unit is provided which may be easily towed, but which is expandable when parked to accommodate multiple users by swinging open the panels on the front and rear end walls and by setting up the framework supporting the flexible fabric enclosures that cooperate with the panels and the end walls to define sleeping space for multiple users. Furthermore, the mattress or cushion supported by the panel includes a portion supported by the panel and another portion supported on a shelf within the main living which extends from the aperture closed by the panel when the unit is moved. When the panel is closed, the portion of the cushion or mattress supported on the shelf is folded over the portion supported by the panel and a releaseable fastener engaged so that the mattress or cushion is raised and lowered with the panel. The fabric enclosure can be collapsed after a removable frame member is removed and stored and is confined to the space adjacent the shelf when the panel is closed, thereby leaving ample room in the main living area to permit it's use even when the panels providing the auxiliary sleeping areas are closed.

BRIEF DESCRIPTION OF THE DRAWINGS

These and other advantages of the present invention will become apparent from the following description with reference to the accompanying drawings, in which:

FIG. 6 is a fragmentary view in perspective taken from the upper rear portion of the vehicle and illustrating a portion of the frame supporting the fabric enclosure before the rest of the frame has been deployed and the fabric enclosure deployed over the frame;

FIG. 7 is a fragmentary cross sectional view taken through the rear wall panel, the fabric enclosure, and support mechanism of the present invention.

DETAILED DESCRIPTION OF THE INVENTION

Figure 1:
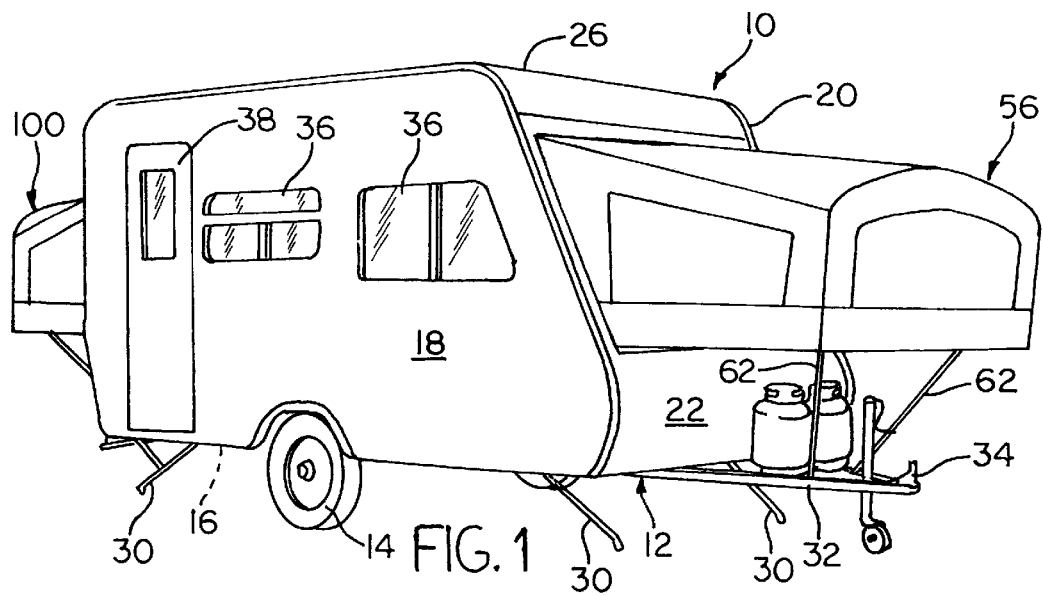
FIG. 1 is a view in perspective taken from the front of a recreation vehicle made pursuant to the teachings of the present invention and illustrating the auxilliary sleeping areas deployed for use when the unit is parked.

Referring now to the drawings, mobile living quarters such as a recreational vehicle generally indicated by the numeral 10 includes a frame generally indicated by the numeral 12 supported by wheels 14. The frame 12 supports a floor 16, side walls 18 and 20, front end wall 22, and rear end wall 24. A roof 26 extends between the walls 18 and 20 and cooperates with the latter to define a main living quarters 28. Conventional leveling jacks 30 extend from the frame 12 when the unit 10 is parked to level the unit in a conventional manner. The frame 12 further includes a converging portion 32 that extends from the front wall 22 and which carriers a conventional coupler hitch 34 for connecting the unit 10 to a towing vehicle. The side walls 18 and 20 may be provided with one or more windows 36 and/or door 38. Frame 12 further includes frame extensions 40 upon which rear bumper 42 is mounted.

Figure 2:
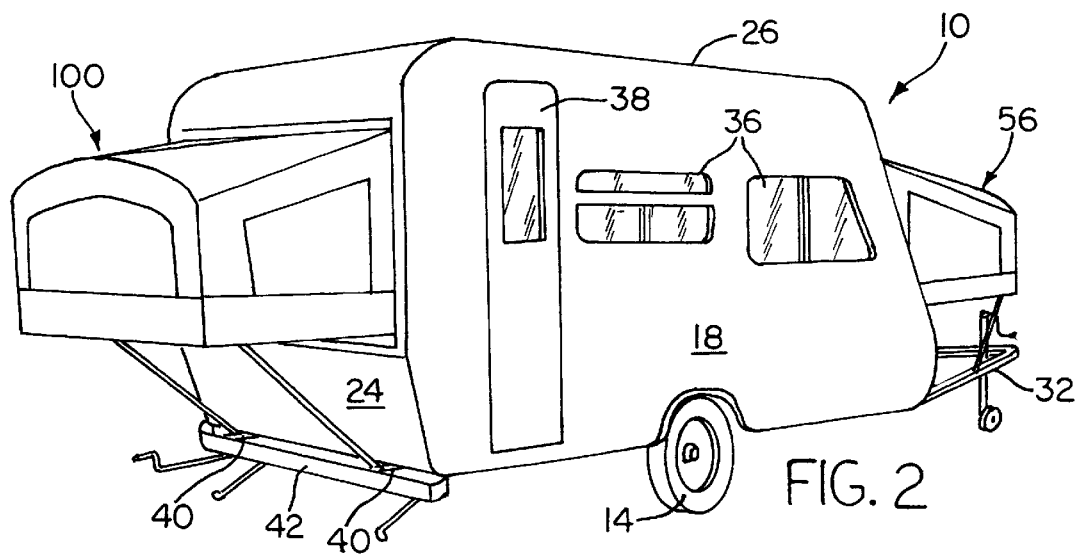
FIG. 2 is a view in perspective taken from a rear corner of the recreational vehicle, and illustrating the auxiliary sleeping areas deployed for use when the unit is parked.
Figure 3:
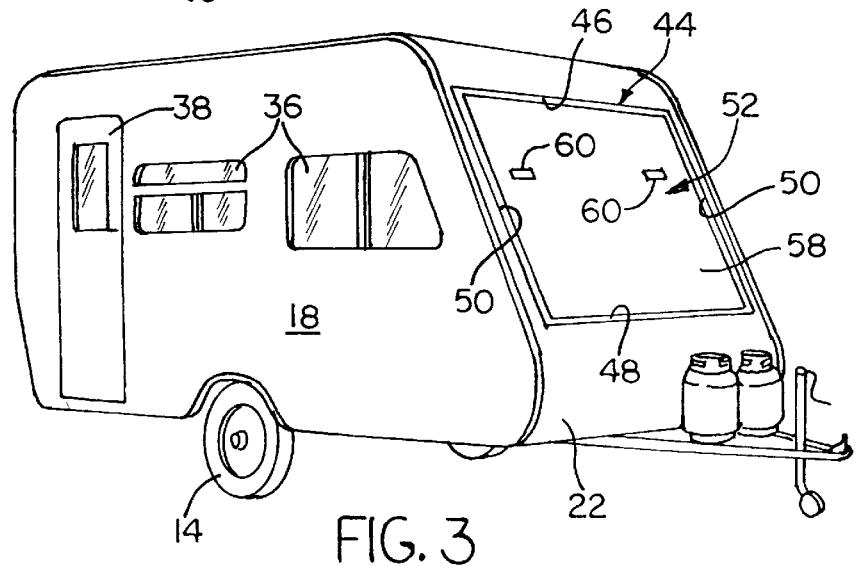
FIG. 3 is a view in perspective from the front of the vehicle and illustrating the panels closed as is the case when the unit is moved.

An aperture generally indicated by the numeral 44 is provided in the front wall 22 and is defined between a top edge 46, a bottom edge 48, and parallel side edges 50 which connect the top and bottom edges 46, 48. A panel 52 is pivotably connected to the front wall 22 by a hinge (not shown) for movement about the hinge between a closed position illustrated in FIG. 3 in which the panel 52 closes the aperture 44 to an opened position illustrated in FIGS. 1 and 2 in which the panel 52 supports a bed cushion or mattress (not shown) and is enclosed by a fabric enclosure generally indicated by the numeral 56. A latch (not shown) secures the panel 52 to front wall 22 when the panel is in the closed position. A fabric supporting frame (not shown) which is substantially identical to the frame supporting the fabric enclosure on the rear wall 24 which will be described hereinafter cooperates with the front wall 22 and panel 52 to define an auxiliary living area. The outer surface 58 of the panel 52 is finished to be compatible with the front wall 22. A pair of sockets 60 are mounted on the front panel 58, but are colored a color compatible with the cover 58 so that the sockets are relatively unnoticeable when the panel 52 is closed as illustrated in FIG. 3. Accordingly, when the panel is closed, the unit 10 has an appearance similar to any conventional, fixed wall recreational vehicle. When the panel 52 is folded outwardly, one end of each of a pair of support rods 62 are received in the sockets 60, and the opposite ends of support rods 62 are received in corresponding sockets (not shown in detail) on the converging portion 32 of the frame 12 to thereby support the panel 52 in an outwardly deployed position to enable the panel as enclosed by the fabric enclosure 16 to be used as axillary living space such as for sleeping. Support rods 62 are similar support rods supporting the panel extending from the rear wall 24 of the unit 10 as will hereinafter be described.

An aperture 64 is provided in the rear wall 24 of the unit 10 and is defined between an upper edge 66, a lower edge 68, and a parallel interconnecting side edges 70. A panel 72 is pivotably connected to the wall 24 by a hinge 74 for movement between a closed position illustrated in FIG. 4 and an open position illustrated in FIGS. 5–8. A latch (not shown) secures the panel 72 to rear wall 24 when the panel is in the closed position. Panel 72 includes an outer surface 76 which is finished to be compatible with the wall 24 and which includes sockets 78, each of which receive a one end of one of a pair of support rods 80, the other end of which is received in corresponding sockets 82 on the extensions 40 of frame 12 when the panel 76 is deployed in the open position to provide an auxiliary living area. The support rods 80, as are the support rods 62, are removed from their sockets and stored within the unit when the panels 76, 52 are disposed in the closed position as illustrated in FIG. 3.

The side of the panel 72 opposite the surface 76 defines a support surface 84 supporting a cushion or mattress generally indicated by the numeral 86. The mattress or cushion 86 includes a portion 88 supported on surface 84 and a portion 90 which is supported on a shelf 92 within the main living quarters which is connected to the portion 88 by hinged connection 94 when the mattress 86 extends through the aperture 64. Accordingly, when the panel 72 is to folded from the open position illustrated in FIG. 8 to the closed position illustrated in FIG. 4, the portion 90 can be flipped over to rest against the portion 88 and then secured in place by use of strap 96 which engages a snap fastener 98 on the surface 84. Accordingly, when the panel 72 is moved to the closed position, the mattress 86 is attached to the panel 72 thereby minimizing the incursion into the living space when the panel 72 is closed.

A flexible fabric enclosure generally indicated by the numeral 100 is attached to the edges 66 and 70 of the aperture 64 and is supported by a frame generally indicated by the numeral 101. The frame 101 includes an arch frame member 102 having a pair of opposite end portions 104 which are pivotably connected to the surface 84 via brackets 106. Accordingly, when the axillary living quarters provided by unfolding the panel 72 is to be deployed, the frame 102 is moved to the erect position illustrated in FIG. 6, and when the panel 72 is to be moved to the closed position illustrated in FIG. 4, frame 102 is folded against the cushion 86. A support frame member 105 includes an end 107 which terminates in a U-connector which engages the frame member 102. The other end of the support frame 105 includes a hooked portion 108 that hooks around header 110 which extends above the upper edge 66 of the aperture 64. A socket connector 112 is mounted on an overhead cabinet 114 within the main living area.

Figure 4:
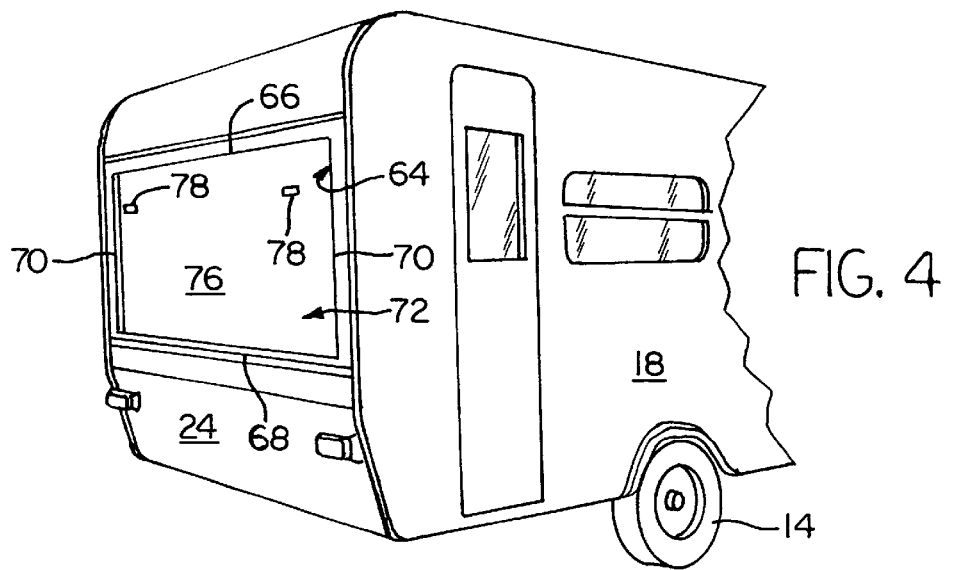
FIG. 4 is a fragmentary view in perspective taken from the rear of the vehicle and illustrating the rear panel closed as is the case when the unit is moved.
Figure 5:
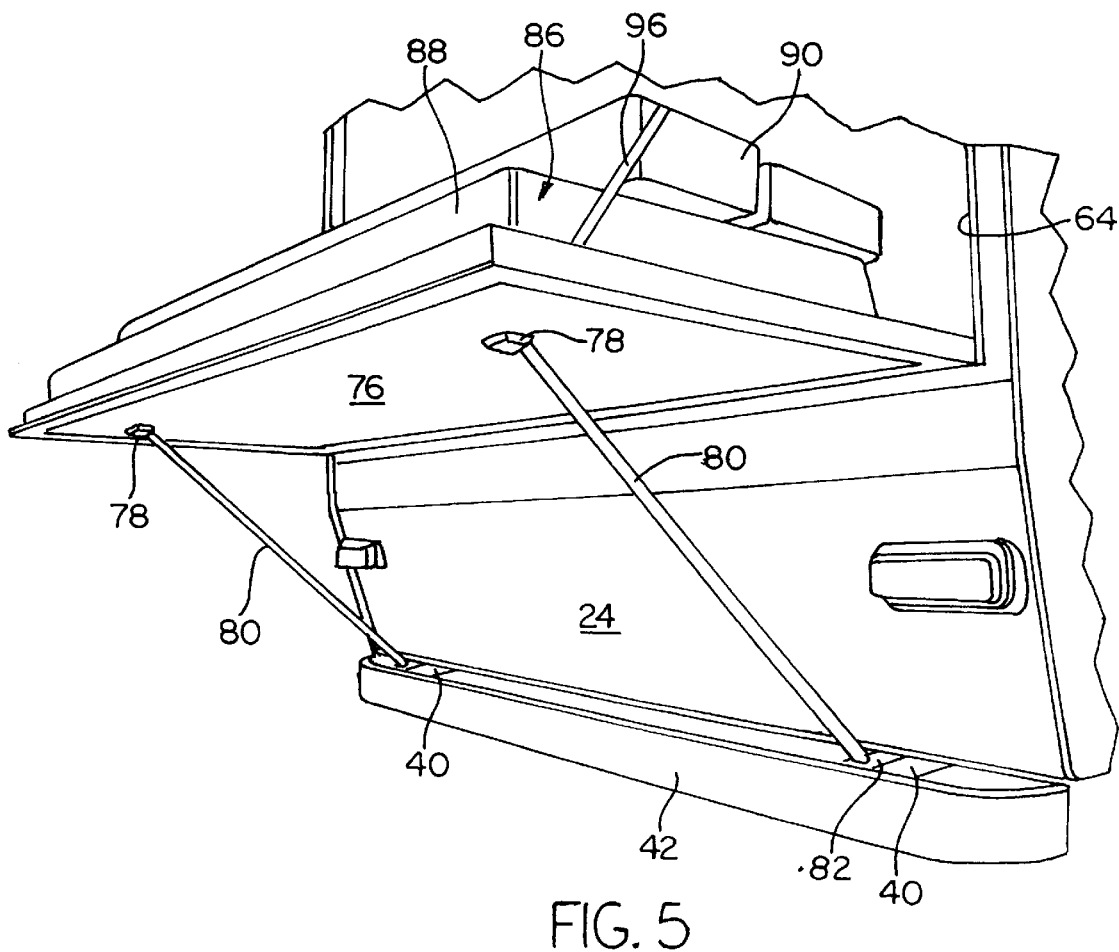
FIG. 5 is a fragmentary view in perspective of the lower portion of the rear wall of the vehicle with the rear panel deployed to provide auxiliary living space, but before the mattress or cushion resting on the panel has been deployed to extend over the shelf in the main living area extending from the aperture closed by the panel.
Figure 8:
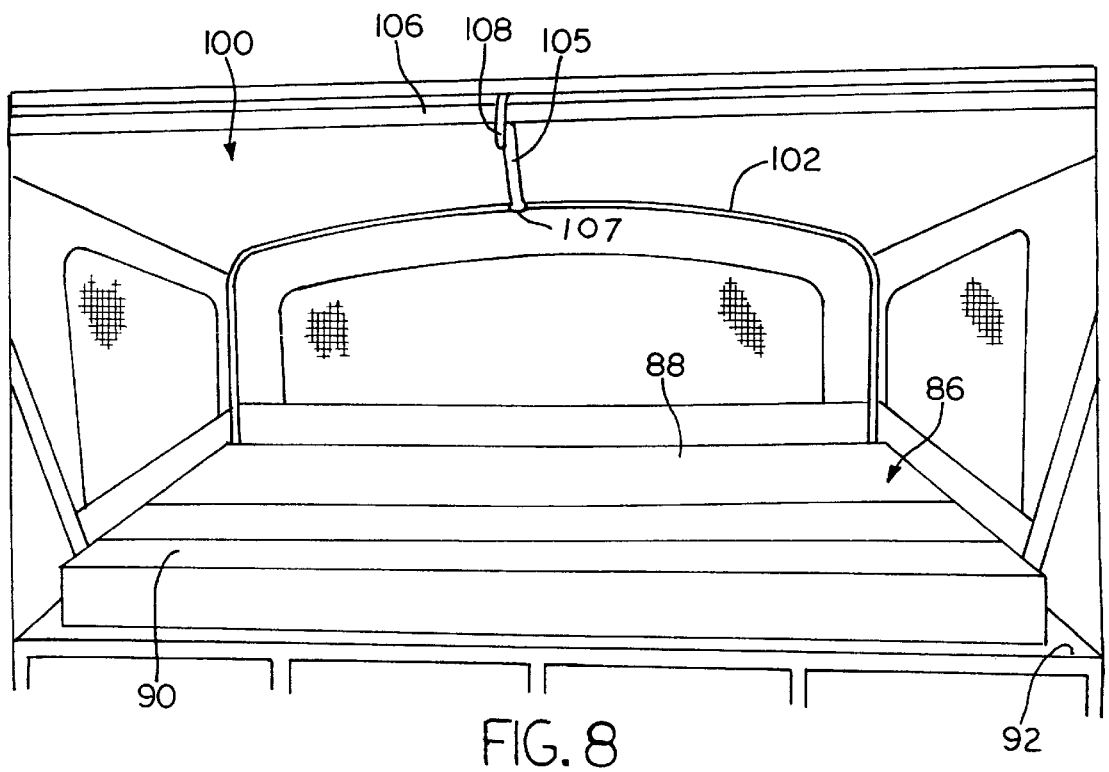
FIG. 8 is a view taken substantially along lines 8—8 of FIG. 7.

When the panel 72 is to be moved into the closed position illustrated in FIG. 4, the support frame member 105 is removed from the socket 112, and then is removed from the frame 102 and stored. The frame 102 can then be folded downwardly against the mattress 86, the portion 90 of the latter already having been flipped over to lie against the portion 88 and secured in place. The fabric enclosure 100 can then be folded and pulled into the aperture 64, thereby permitting the panel 72 to be closed into the FIG. 4 position. The support rods are then removed from their sockets 78 and 82 and stored. The panel 72 may then be closed. It will be understood that the fabric enclosure 56 is supported by a frame substantially similar to frame 101 and includes frame members corresponding to frame members 102, 105, which are removed or folded inwardly to permit folding of the fabric enclosure 56 to permit the panel 52 to be folded into the closed position illustrating in FIG. 3.

Accordingly, after both of the panels 52 and 72 have been closed, the unit 10 is practicable indistinguishable from a normal unit and provides a solid, stable, weather tight enclosure which is towed by any appropriate towing vehicle (not shown) by coupling with the hitch 34. When the panels 52 and 72 are closed, the main living area may be used because the mattresses are secured to the panels and the fabric enclosures 56, 100 may be pulled into the corresponding apertures to surround the mattresses so that they intrude minimally on the interior living space. The support rods 62 and 80 are light in weight and may be easily removed from their sockets and stored in the unit. Accordingly, the complicated, expensive and heavy support mechanisms necessary in prior art units are not required. Similarly, the frames 101 are simple and light in weight, and the support frames 105 are easily disconnected from the frames and stored, thereby permitting the arch support frame 102 to be folded against the mattress and the fabric enclosure to be pulled through the corresponding aperture.

What is claimed is:

1. Mobile living quarters comprising main living quarters including a main frame supported on wheels for transporting said mobile living quarters, said main frame carrying a hitch for connection with a towing vehicle, a floor mounted on said main frame, rigid side walls and rigid end walls extending from said floor and supporting a roof, an aperture in one of said end walls defined by edges including a lower edge, a hinge mounted on said one wall and extending along said lower edge of the aperture mounting a rigid panel movable about said lower edge from a closed position in which one side of said rigid panel is substantially flush with said one side wall and an open position extending substantially horizontally from said one side wall, the other side of said panel in said open position cooperating with said one wall and with a flexible fabric enclosure extending between said one wall and said panel to define an auxiliary living quarters, a fabric supporting frame for supporting said flexible fabric enclosure when the panel is in the open position, a shelf extending inwardly into said main living area from said one wall adjacent the lower edge of said aperture, a cushion supported by said shelf and said panel when the panel is in the open position, said cushion being positioned against said panel when the panel is moved to the closed position.

2. Mobile living quarters as claimed in claim 1, wherein said fabric enclosure is folded about said cushion when the panel is moved to the closed position.

3. Mobile living quarters comprising main living quarters including a main frame supported on wheels for transporting said mobile living quarters, said main frame carrying a hitch for connection with a towing vehicle, a floor mounted on said main frame, rigid side walls and rigid end walls extending from said floor and supporting a roof, an aperture in one of said end walls defined by edges including a lower edge, a hinge mounted on said one wall and extending along said lower edge of the aperture mounting a rigid panel movable about said lower edge from a closed position in which one side of said rigid panel is substantially flush with said one side wall and an open position extending substantially horizontally from said one side wall, the other side of said panel in said open position cooperating with said one wall and with a flexible fabric enclosure extending between said one wall and said panel to define an auxiliary living quarters, a fabric supporting frame for supporting said flexible fabric enclosure when the panel is in the open position, a cushion extending across the lower edge of the aperture and said panel when the panel is in the open position, said cushion being positioned against said panel with said fabric closure folded around said cushion when the panel is moved to the closed position.

4. Mobile living quarters comprising main living quarters including a main frame supported on wheels for transporting said mobile living quarters, said main frame carrying a hitch for connection with a towing vehicle, a floor mounted on said main frame, rigid side walls and rigid end walls extending from said floor and supporting a roof, an aperture in one of said end walls defined by edges including a lower edge, a hinge mounted on said one wall and extending along said lower edge of the aperture mounting a rigid panel movable about said lower edge from a closed position in which one side of said rigid panel is substantially flush with said one side wall and an open position extending substantially horizontally from said one side wall, the other side of said panel in said open position cooperating with said one wall and with a flexible fabric enclosure extending between said one wall and said panel to define an auxiliary living quarters, a fabric supporting frame for supporting said flexible enclosure when the panel is in the open position, a shelf extending inwardly into said main living area from said one wall adjacent the lower edge of said aperture, a cushion supported by said shelf when the panel is in the open position.

\* \* \* \* \*